(12) United States Patent
Beecher et al.

(10) Patent No.: US 11,371,918 B2
(45) Date of Patent: Jun. 28, 2022

(54) METHOD TO CORRECT ION SOURCE INEFFICIENCIES MAKES SAMPLE-TO-SAMPLE NORMALIZATION POSSIBLE

(71) Applicant: IROA Technologies, LLC, Chapel Hill, NC (US)

(72) Inventors: Christopher William Ward Beecher, Chapel Hill, NC (US); Felice de Jong, Sea Girt, NJ (US)

(73) Assignee: Iroa Technologies, LLC, Chapel Hill, NC (US)

( * ) Notice: Subject to any disclaimer, the term of this patent is extended or adjusted under 35 U.S.C. 154(b) by 245 days.

(21) Appl. No.: 16/450,569

(22) Filed: Jun. 24, 2019

(65) Prior Publication Data
US 2019/0391054 A1 Dec. 26, 2019

Related U.S. Application Data

(60) Provisional application No. 62/688,846, filed on Jun. 22, 2018.

(51) Int. Cl.
*G01N 1/28* (2006.01)
*H01J 49/00* (2006.01)

(52) U.S. Cl.
CPC .............. *G01N 1/28* (2013.01); *H01J 49/0036* (2013.01)

(58) Field of Classification Search
None
See application file for complete search history.

(56) References Cited

PUBLICATIONS

Christopher W.W. Beecher CV.
E-mail accepting the presentation of the Poster of Fig. 1a.
Lorenzi et al. Poster presented at 14th Annual Conference of the Metabolomics Society in Seattle, Washington on Jun. 24-28, 2018.
Enlarged vertically divided left-hand portion of Fig. 1A.
Enlarged vertically divided center portion of Fig. 1A.
Enlarged vertically divided right-hand portion of Fig. 1A.
Beecher & de Jong Poster presented at the 67th American Society for Mass Spectrometry (ASMS) Conference on Mass Spectrometry and Allied topics, Jun. 2-6, 2019 in Atlanta, Georgia.
Enlarged vertically divided left-hand portion of Fig. 2A.
Enlarged vertically divided center portion of Fig. 2A.
Enlarged vertically divided right-hand portion of Fig. 2A.

*Primary Examiner* — Xiaoyun R Xu
(74) *Attorney, Agent, or Firm* — Husch Blackwell LLP

(57) ABSTRACT

In mass spectrometry significant error is introduced during sample preparation (sample-to-sample error), during ion generation (ion suppression), and during ion transmission (ion transmission losses). We demonstrate the ability to correct for ion suppression and ion transmission losses, and that once corrected for ion losses, a sample-to-sample normalization of the analytical sample to the internal standard is possible. By normalizing to a standard sample the analytical sample becomes completely comparable to any similarly treated sample.

19 Claims, 9 Drawing Sheets

METHOD TO CORRECT ION SOURCE INEFFICIENCIES MAKES SAMPLE-TO-SAMPLE NORMALIZATION POSSIBLE

CROSS-REFERENCE TO RELATED APPLICATION

This application claims priority to U.S. application 62/688,846 filed on Jun. 22, 2018, whose disclosures are incorporated by reference.

BACKGROUND ART

Traditionally, mass spectrometry is not considered a good quantitative method because of the variability that is frequently introduced in ion sources due to either the inefficiencies of ion generation, or ion transmission. For this reason, in situations where accurate quantitation is desired internal standards and a clean "base-line" chromatographic separation are required. This practice becomes expensive and awkward as the number of compounds to be measured increases; therefore in most cases the number of compounds to be quantified is kept small and internal standards with well-defined chemical concentrations and composition are employed.

The actual act of quantitation is done on a compound-by-compound basis and quantitation is achieved by directly comparing the quantity of internal standard to the quantity of analyte; i.e., the ratio of the analyte to internal standard is multiplied by the known quantity of the internal standard. This achieves a better quantitative solution for each compound than the raw data that was originally acquired since it almost always suffered from some ion losses.

The present invention takes a global approach that corrects the whole sample and reaps the additional benefits of normalization and directly quantifying the percent of losses for each compound. There is no known prior literature that has taken this approach.

The variances seen in the ion sources of most mass spectrometers arise from ionization losses during two distinct parts of the analytical processes required; namely, the generation and transmission of the ions that are measured. Ion suppression is a general term that applies to ion losses or inefficiencies that occur during the process of the generation of ions. Additional ion losses occur during the transmission of ions through source and mass analyzer. These two processes cause ion losses or variance, but they are very different in their nature.

Ion suppression losses vary compound by compound and are sensitive to the environment in which an ion is created therefore they vary sample to sample, while the ion losses due to a source's geometries, and electronics are subject to significant change, but are stable for extended periods of time; both create different kinds of problems for the mass spectroscopist as they reduce the overall sample-to-sample comparability, short-term and long-term.

Metabolomics analyses are currently divided into two main methods {Fiehn[1]}, namely, targeted {Roberts[2]} and non-targeted {Vinayavekhin[3]} analyses. Although, by definition, almost all clinical measurements are targeted, most of these measurements are not part of metabolomic investigations, so by far, the largest number of metabolomic investigations start with non-targeted, often called "unbiased", analyses.

The beauty of the non-targeted analysis is that it makes no presumptions as to the class of molecules that need be investigated and thus, is considered a good means of hypothesis generation and the first step in a larger series of "discovery" investigations. Unfortunately, the techniques generally employed in non-targeted analyses have at their heart a series of assumptions that are often forgotten or mis-understood.

The three most serious of these assumptions are that 1) ion suppression, often called matrix effect (ME), is likely consistent across all samples for a given sample type, and therefore may be ignored; 2) ion transmission losses will not change significantly during the run time of a given experiment; and 3) that the samples are similar enough in size and form that normalization is either simple or un-necessary.

As discussed hereinafter, all three of these assumptions are related and all three can be corrected once they are related to one another. Although initially applied to metabolomics the present solution applies to all situations where a large number of compounds need to be quantitated using a chemically complex internal standard, or normalization is based on corrected data.

Ion suppression (suppression) is a well characterized {Annesley[4], Trufelli[5], Jessome[6]}, though poorly understood, phenomenon having to do with the variance of the efficiency of ionization of any molecule. First described in the early 1990's by Kebarle {Ikonomou[7], Kebarle[8], and Tang[9]}, ion suppression is considered to be present to some extend in almost all ionization sources, including MALDI {Knochenmuss[10]} and DESI/MALDI {Taylor[11]}, but it is particularly an issue with the most common sources used today, the ElectroSpray Ionization source (ESI) and Atmospheric Pressure Chemical Ionization (APCI) {Ismaiel[12]}.

In general, suppression is considered a complex function of molecular structure that involves all of a compound's physical parameters; i.e., acidity/basicity, polarity/aromaticity, hydrophobicity/lipophilicity, electronic and physical structures, the concentration of the compound itself {Annesley[4]}, the nature of the source, elution solvents, gas temperature, and the general chemical environment and complexity of the effluent in which the compound elutes.

It has been shown that reduction of chemical complexity of the samples, e.g. during sample preparation by solid phase extraction (SPE), or by base-line chromatographic separation, can reduce suppression for some compounds but, neither of these methods completely removes suppression {Vats[13]}. Similarly, reduction of the total concentration of a compound, for instance by use of nanoSpray sources, will again reduce, but not remove suppression {Temesi[14]}.

Because suppression occurs in the ionization processes of the source, suppression is a phenomenon relevant to all post-source MS processes, including ms/ms {Freitas[15]}. Suppression is dependent upon the chemical properties of the analyte as it passes into the source and varies in intensity of suppression for each compound as a function of concentration; i.e., it is never stable, and even slight variations of the chromatographic process, ion source, solvent, or temperature can alter it.

The most common way to correct for the effects of ion suppression is through the use of internal standards {Baillie[16]} that became called "Stable isotope dilution-mass spectrometry" (SID-MS) {Leenheer[17]}. When the number of compounds being measured is small, use of individual aliquots of purified isotopic standard, SID-MS, represents the optimal solution. However, as the number of compounds that needs to be measured increases, the economics become untenable.

Therefore, techniques such as MIRACLE {Mashego[18], Wu[19]} based on isotopically enriched biological mixtures were developed; however, the difficulty of identifying the isotopic peaks amongst the others made this technique difficult to use in practice. Other attempts at using isotopic internal standards have tried using a single representative compound as a standard for other compounds of that class. However, as was noted above the immediate source environment is a critical component of suppression, and the likelihood that the standard compound is suffering the same level of suppression as the analyte is difficult to assure if they are in different environments.

When a biological extract is an extract of an organism, such as an *E. coli*, the analysis becomes a targeted analysis for all of the compounds in the biochemically-complex internal standard. These techniques are based on the fact, demonstrated by many of the above authors, that both the standard and the analyte are always suppressed to the same extent if they are coeluting.

Under these circumstances, the ratio of the analyte to the standard allows the calculation of the concentration of the analyte if the concentration of the standard is known. This calculation is easily accomplished and the endpoint of all such studies.

However, it needs to be noted that the use of deuterium in the standard almost always alters the chromatographic behavior of a compound, risking that the analyte and the standard compound will not co-elute. For these reasons, the use of heavy stable carbon isotopes that do not change chromatographic behavior of the compound, such as $^{13}C$, $^{15}N$, $^{18}O$, etc. must be used.

The difficulties of techniques such as MIRACLE, where the isotopic standards are synthesized or biosynthesized using >99% $^{13}C$, is that the resulting isotopic standards are difficult to distinguish from other peaks resulting in a large number of false data points. The IROA protocols {de Jong[20], Stupp[21], Qui[22], Clendinen[23]} are one solution in that the standards are based on specific isotopic probabilities for each carbon, generally 5% U-$^{13}C$ and/or 95% U-$^{13}C$. These percentages create isotopomeric patterns in the mass spectrum of each compound that are unique for each formula and, most importantly, are both easily identified within mass spectral scans, and will be rarely mimicked by random noise. Aside from the complexity of their isotopomeric clusters they perform exactly like any isotopic standard and share almost all the physical chemical properties of their natural abundance counterparts, except mass.

Unlike ion suppression losses, ion transmission losses have a longer-term stability but change when the electronic or physical characteristics of the ion source are changed. These changes are foundational.

Thus, unlike ion suppression, which is continuously changing, ion transmission variances can make it difficult to directly compare the results for one sample or experiment with the results seen even in a reanalysis of the same samples that are analyzed after the source has been altered, but do not, in general, effect a single analytical body of results. Although sources seem like fairly simple devices, altering the angle of the effluent spray during the initial ion generation, changing the voltages for any of its surfaces, or lenses, or adjusting or cleaning the capillary or other internal surfaces, among so many other things, alters the numbers of ions that are transmitted in the mass spectrometer, rendering comparison of samples run at different times difficult to useless. Whereas efforts are frequently made to reduce the overall level of transmission losses, little effort has been made to correct for it.

Sample-to-sample normalization, like suppression, is a well characterized area of study and there are many methods for the normalization offered {Li[24]}. Normalization is critical whenever samples are of different sizes, dilutions, or are be biologically dissimilar. Thus, most common sample types, e.g. urine (variance from dilution), plasma (variance by dilution), biopsies (variance from mixed cell populations), experimentally grown cells (variance from number of cells in each growth), etc., can benefit from normalization. Despite this criticality, normalization is not commonly encountered in published data because there is no generally accepted way to achieve it, and most methods yield different results because they are based on different principles. Because none of the normalization methods published considers the effects of suppression, although they do a better job than using un-normalized data, the uncorrected variances of the suppressed data mean that they cannot achieve an accurate normalization.

The invention disclosed hereinafter extends methods described in the following U.S. Pat. No. 7,820,963, the basic IROA patent, issued Oct. 26, 2010, referred to hereinafter as IROA963; U.S. Pat. No. 7,820,964, issued Oct. 26, 2010, and referred to hereinafter as IROA964; U.S. Pat. No. 8,168,945, issued May 1, 2012, referred to hereinafter as IROA945; U.S. Pat. No. 8,536,520, issued Sep. 17, 2013, referred to hereinafter as IROA520; U.S. Pat. No. 8,969,251 that issued Mar. 3, 2015, is referred to hereinafter as IROA251, and U.S. Patent Application Publication U.S. 2018/0315587 A1, published on Nov. 1, 2018, and referred to herein as IROA587. These patents, application and the art cited therein are incorporated herein by reference.

BRIEF SUMMARY OF THE INVENTION

A method of correcting for in-source or transmission losses of ions during mass spectral (MS) analytical analysis and using for the corrected ion data to normalize for sample-to-sample differences is contemplated. In accordance with this contemplated method, an analytical sample is mass spectrally-analyzed to provide raw data of peak sets of parent and one or more daughter peaks indicative of each of the compounds present. The analytical sample is comprised of two portions of biologically-produced and/or semisynthetically-produced compounds having molecular weights of about 60 Da to about Da 100,000.

A first portion of that analytical sample is comprised of elements whose isotopes are present in their naturally abundant amounts (first isotopes). The second portion provides isotopically signed compounds that may be present in the first sample (second isotopes). The isotopic signature is provided by the presence of stable second isotopes of one or more of the naturally abundant first isotopes of the elements of the first portion other than hydrogen and deuterium. The contemplated naturally abundant isotopes are typically of lower molecular weight relative to the isotope of the same element in the second portion. As a consequence, the compounds that are present in both the first and the second portions are isotopomers.

For ease of understanding, 12C and 13C are usually used throughout this document as exemplary of first and second isotopes. Those isotopes are also preferred for use herein.

In that analytical sample, a first portion is the natural isotopic abundance C12 experimental sample and a second portion is a chemically complex Internal Standard sample containing about 50 to about 10,000 isotopically signed C13-containing compounds that may be present in the experimental sample. The compounds present in both the natural abundance sample and the Internal Standard sample are referred to as paired compounds and their MS peaks are referred to as paired peak sets.

The summed height of the peaks of a given compound's peak set can provide a relative measure of the amount of that compound present in its portion of the analytical sample. The sum of the areas under a compound's peak set also provides a relative measure of the amount of that compound present in its portion. Thus, summing the heights or areas of a peak set of paired compounds present in each portion and determining the ratio of summed height to summed height, or summed area to summed area for those paired compound peaks provides a ratio of the relative amounts of the two isotopes, e.g., 12C/13C, present in the compounds of both portions.

Each of the paired peak sets is separately corrected for ion losses and the resulting corrected value is used for determination of a Normalization Factor. For this aspect, in-source ion losses are corrected for each compound by correcting its Internal Standard to a value that is an experimentally determined constant value and is always the same to provide a loss-corrected Internal Standard value. The C12/C13 ratio for each compound assayed in each analytical sample is determined as the total area or peak set heights of all natural abundance C12 peaks for the compounds as seen in the raw data divided by the total area or peak set heights, respectively, of all Internal Standard C13 peak sets for the compounds as seen in the raw data. The loss-corrected natural abundance value for the natural abundance compounds is determined by multiplying the loss-corrected Internal Standard value by the C12/C13 ratio for each of those compounds.

A Normalization Factor is determined for all corrected paired peak compounds using a normalization algorithm that utilizes summing technology with all corrected values so obtained for all paired peak sets for both the natural abundance and the Internal Standard portions of the analytical sample. The sum of the Internal Standard portion is the sum of the loss-corrected Internal Standard values for all compounds present in both analyte portions, and the sum of the natural abundance portion is the sum of the loss-corrected natural abundance values for all compounds present in both analyte portions.

In one embodiment, a Normalization Factor for each analytical sample is calculated by dividing the sum of the natural abundance portion by the sum of the Internal Standard portion. The data for each assayed natural abundance compound of the analytical sample is normalized by multiplying each individual loss-corrected natural abundance value by the inverse of the Normalization Factor to provide a normalized natural abundance value.

BRIEF DESCRIPTION OF THE DRAWINGS

In the drawings forming a portion of this disclosure,

FIG. 3 is itself a graph showing plots of raw MS total useable signal (MSTUS) C12 values (diamonds) and corrected MSTUS C12 values (squares) obtained versus injected aliquot size, clearly showing that the raw values do not double with a doubling of the aliquot volume;

FIG. 4 shows a base ratio of C12 to C13 across all samples with a correlation of 0.9967;

FIG. 5 is a graph showing frequency versus percent ion suppression for all of the compounds assayed that illustrates that all compounds showed some level of ion suppression;

FIG. 6 is a graph showing MS signal values versus aliquot size in microliters for a compound of the formula $C_9H_{16}N_2O_5$, wherein raw values are shown as circles and corrected values are shown as diamonds, and showing that compounds with very high levels of ion suppression are not correlated to their concentrations, noting that suppression of 91.8% was noted at an aliquot size of 400 µL, and noting that peak height or area is negatively correlated to injected concentration at this level;

FIG. 7 is a graph showing MS signal values versus aliquot size for corrected C12 values (squares) and normalized values (triangles);

FIG. 8 is a graph that plots MS signal versus aliquot size for a stearic acid sample in which raw data values are shown as diamonds, normalized values are shown as squares and expected values are shown as triangles, that illustrates that normalization of compounds without Internal Standards are correctly normalized but retain suppression because those values could not be corrected for without an Internal Standard.

DETAILED DESCRIPTION OF PREFERRED EMBODIMENTS

Figure 1:
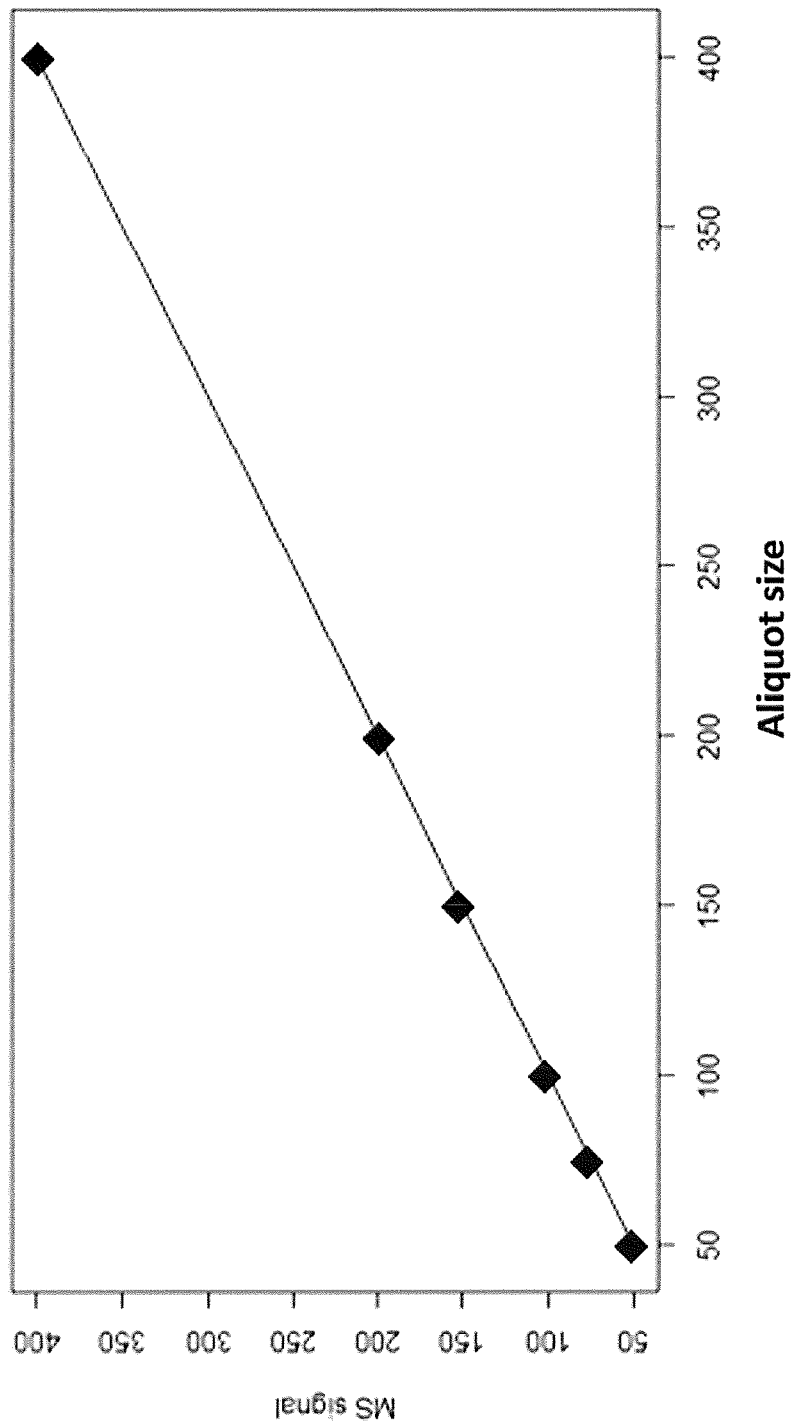
FIG. 1 is a graph showing a theoretical 12C signal for any compound in plotting the MS raw data signal obtained as a function of injected aliquot size.

The present invention contemplates a method of correcting for in-source or transmission losses of ions during mass spectral (MS) analytical analysis and using for the corrected ion data to normalize for sample-to-sample differences. In accordance with this contemplated method, an analytical sample is mass spectrally-analyzed to provide raw data of peak sets of parent (base) and one or more daughter peaks that are indicative of each of the compounds present.

It is to be understood that in most MS analyses, a single compound provides a base (parent; tallest) peak and one or more daughter peaks whose heights are less than that of the parent and dependent, inter alia, on a number of well-known factors, particularly the amount of naturally non-most abundant isotopes present in an assayed compound. As a consequence, each analyzed compound typically provides a plurality of data values that appear as MS peaks, and are referred to herein as "peak sets" for each compound present and assayed.

The analytical sample is comprised of two portions referred to herein as the first and second portions that are biologically-produced and/or semisynthetically-produced (discussed hereinafter) compounds having molecular weights of about 60-75 Da to about Da 100,000. The molecular weights of the compounds examined are typically of a narrower range, with the studied range being a function of the machine used and the sample preparation techniques utilized.

One preferred weight range is about 60 Da to about 2000 Da. Another preferred range looks to compounds of 1000 Da or less to about 60 Da. [Molecular weights expressed as Daltons (Da) and atomic mass units (AMU) are used interchangeably herein.]

A first portion of an analytical sample is comprised of elements whose isotopes are present in their naturally most abundant amounts (first isotopes). A second portion provides isotopically signed compounds that may be present in the first sample (second isotopes).

An isotopic signature (sign) is provided by the presence of a stable second isotope of one or more of the naturally most abundant first isotopes of the elements of the first portion. The contemplated naturally most abundant isotopes of the first portion are usually of lower molecular weight relative to the isotope of the same element in the second portion. The compounds that are present in both the first and the second portions are called isotopomers.

A stable naturally non-most abundant isotope is stable to radioactive decay. Illustrative examples of first and second isotopes of the same atom are one or more elements selected from the group consisting of isotopes of carbon (C12 and C13), nitrogen (N14 and N15), oxygen (O16, O17, or O18), sulfur (S32, S33, S34, or S36), chlorine (Cl35 and Cl37), magnesium (Mg24, Mg25 and Mg26), silicon (Si27, Si28 and Si29), calcium (Ca40, Ca42, Ca43, and Ca44), and bromine (Br79 and Br81). First and second isotopes are other than hydrogen and deuterium.

For ease of understanding, 12C and 13C are usually used throughout this document as exemplary of first and second isotopes. Those isotopes are also preferred for use herein.

In that analytical sample, a first portion is the natural isotopic abundance C12 experimental sample and a second portion is a chemically complex Internal Standard sample containing about 50 to about 10,000 isotopically signed C13-containing compounds that may be present in the experimental sample. The number of such isotopically signed C13-containing compounds is narrowed to about 50 to about 2000 in some preferred embodiments. Such narrowing can be accomplished by adjustment of chromatographic techniques as is well known.

An experimental sample portion of an analytical sample is typically of biological origin such as serum, plasma, urine, lymph or other body fluid or product such as feces, a cell culture lysate, minced plant animal or fungal tissue. An experimental sample portion can also originate from a laboratory chemical reaction in which a reaction composition containing one or more reactants, products and side products are present.

The compounds present in both the natural abundance sample and the Internal Standard sample are referred to as paired compounds (isotopomers) and provide paired peak sets on MS analysis. The summed height of the peaks of a given compound's peak set can provide a relative measure of the amount of that compound present in its portion of the analytical sample. The sum of the areas under the curve of a compound's peak set also provides a different relative measure of the amount of that compound present in its portion.

Thus, summing the heights or areas of a peak set of paired compounds present in each portion and determining the ratio of summed height to summed height, or summed area to summed area for those paired compound peaks provides a ratio of the relative amounts of the two isotopes, e.g., 12C/13C, present in the compounds of both portions.

Each of the paired peak sets is separately corrected for ion losses and used for determination of a Normalization Factor. For this aspect, in-source ion losses are corrected for each compound by correcting its Internal Standard to a value that is an experimentally determined constant value and is always the same to provide a loss-corrected Internal Standard value. The C12/C13 ratio for each compound of a compound pair assayed in each analytical sample is determined as the total area or peak set height of all natural abundance C12 peaks for the compounds as seen in the raw data divided by the total area or peak set height, respectively, of all Internal Standard C13 peak sets for the compounds as seen in the raw data. The loss-corrected natural abundance value for the natural abundance compounds is determined by multiplying the loss-corrected Internal Standard value by the C12/C13 ratio for each of those compounds.

A Normalization Factor is determined for all corrected paired peak compounds using a normalization algorithm that utilizes summing technology with all corrected values so obtained for all paired peak sets for both the naturally most abundant and Internal Standard portions of the analytical sample. The sum of the Internal Standard portion is the sum of the loss-corrected Internal Standard values for all compounds present in both analyte portions, and the sum of the natural abundance portion is the sum of the loss-corrected natural abundance values for all compounds present in both analyte portions.

A Normalization Factor for each analytical sample is calculated by dividing the sum of the natural abundance portion by the sum of the Internal Standard portion. The data for each assayed natural abundance compound of the analytical sample is normalized by multiplying each individual loss-corrected natural abundance value by the inverse of the Normalization Factor to provide a normalized natural abundance value.

In one preferred embodiment, the isotopic signatures of the paired compounds conform to an IROA pattern as is described in U.S. Patent Application Publication U.S. 2018/0315587 A1 and the related patent documents noted previously. In another preferred embodiment, a loss-corrected Internal Standard value for each compound is an experimentally determined value obtained from data of another analysis; i.e., an analysis other than that recited in the claims. In another embodiment, a loss-corrected value for each compound in the Internal Standard is retrieved from a database of assigned values. In yet another embodiment, a loss-corrected Internal Standard value for each compound is an experimentally determined from the data in the current or recited (claimed) analysis.

In another preferred embodiment, isotopic signatures are provided semisynthetically by separately reacting compounds of the first portion and second portion of the analytical sample with one or the other of an isotopomeric reagent pair containing the same reactive group that reacts with and bonds to a functional group of one or more paired compounds present in the analytical sample portions. In this embodiment, separate reaction of the compounds of the first portion and second portion of the analytical sample with one or the other of an isotopomeric reagent pair is carried out prior to admixture of said first portion and said second portion to form the analytical sample.

Thus, illustratively using cell cultures as the source of the two portions, one can lyse the cells and separately react the resultant lysates with one or the other of the isotopomeric reagent pair providing a defined signature such as an IROA signature or similar pattern, separate the insoluble cell debris from the remainder as by centrifugation, and mixing the resulting two supernatants to form the analytical sample preparation. Alternatively, the desired isotopomeric labeling reactions can be carried out on each of the supernatants followed by admixture to form an analytical sample composition.

The phrase "analytical sample" is therefore used herein as a generic phrase intended to encompass both an "analytical sample preparation" and an "analytical sample composition", as use of either provides enhanced results over the prior art. Use of an "analytical sample composition" is preferred if only because more isotopomeric reagent is needed to adequately react with cellular contents including debris, and would therefore be wasteful.

Once formed, an analytical sample is typically physically separated by gas chromatography (GC) or more usually liquid chromatography (LC) or high pressure liquid chromatography (HPLC) and the eluate is then provided to a mass spectrometer for mass spectractral (MS) analysis. The separation technique is thus often referred to in modern literature as LC-MS.

Analytical samples are made by mixing an experimental sample (to be analyzed), such as a biological extract, with a constant amount of a chemically complex isotopically distinguishable Internal Standard. As a minimal definition, the Internal Standard contains a reproducible set of compounds at reproducible concentrations and can be used repeatedly, ideally for at least five to ten years; however, shorter term internal standards can be made to work using this method wherein the results are only be comparable for shorter periods of time.

In one preferred embodiment, the chemical composition of the Internal Standard matches small molecular weight compounds (e.g., less than about 2000 Da and more usually less than about 1000 Da) of the complete chemical composition of the experimental sample. However, the natural chemical variance of the experimental samples excludes perfection. The lower weight limit for a biologically-produced metabolite is about 60-75 AMU as in acetic acid and glycine. Therefore, the Internal Standard preferably has at least about 50 compounds found in all experimental samples. The Normalization is better as the number of commonly found compounds increases.

Because of the chemical complexity of the Internal Standard, all analytical samples can be viewed as consisting internally of two complete samples; the experimental sample and the Internal Standard sample. After the analytical samples are analyzed, software such as ClusterFinder™, mzMine, mass-hunter, or similar such software is used to find and quantitate all of the peaks found in each sample.

Each of the peaks from the Internal Standard should be identified as derived from the Internal Standard, and each of the peaks from the experimental sample should be identified as derived from the Experimental sample. For each analytical sample all cases in which the same compound is found in both the Experimental and Internal Standards should be identified and can be called the "commonly found list".

For all compounds in the "commonly found list" there will be a mass spectral response for both the compound originating from the Experimental sample and its isotopomer originating from the Internal Standard. This response can be in the form of area under the curve (or summed peak height), the height of the monoisotopic, or other standard measures may also be used. The response seen is referred to as the "raw C12 response" and the "raw IS response", respectively. It is well-known, and demonstrated in the Example hereinafter, that such raw responses are not correct universal reflections of the concentrations of their underlying compounds due to the presence of significant variances in the generation and transmission of the ions in the source, and other parts of the mass spectrometer.

In addition to these raw values, a raw "C12/C13 ratio" can be calculated by dividing the "raw C12 response" by the "raw IS response". Thus, from the analytical data for all compounds found we can derive three values, the "raw C12 response", the "raw IS response", and the "C12/C13 ratio".

The first two are known to be imperfect reflections of their true values, but the third is understood by skilled practitioners to be an accurate reflection of the ratio of the original true values because it is accepted that the losses suffered in the analytical processes will be applied equally by both sides.

For the Internal Standard, if the accurate original value; i.e., a response that suffers no, or minimal, loss is known then the "raw IS response" can be replaced with a "corrected IS response" and the "corrected C12 response" can be calculated by multiplying the "corrected IS response" by the "C12/C13 ratio".

The accurate original value can be determined either experimentally or determined once for each Internal Standard, recorded and then this value is subsequently retrievable by software as needed. Because the error in the raw response is its variability, to one versed in the art the precision of the "accurate original value" is less important than the use of a constant and reproducible value multiplied by the "C12/C13 ratio".

The losses in the raw data vary by both time and compound in a complex way. Some losses are due to the nature of each specific chemical structure and vary within each sample as the environment in which the compound is caused to ionize changes.

It is similarly well known that other losses are imposed broadly on all compounds as a function of the physical parameters of the Ion Source change. These latter losses have much longer timelines, but when they change the they make samples from before and after directly incomparable. Although there are approaches to compensating for such long-term losses, they are required to make assumptions that the underlying samples are actually comparable, which may or may not be true.

The technique described here correct for both of these types of losses and does so quite accurately using first principles that are generally accepted by all in the field but have never been implemented. The use of a standard value for the accurate original value is particularly useful as it specifically overcomes the longer-term changes.

Having corrected for ion losses there is still a problem that has not been solved, namely the fact that the samples may have different sizes, as discussed above this can make even samples with corrected results incomparable to other samples. This problem is commonly called a normalization problem. As discussed earlier, there are many approaches to normalization.

A summing-type normalization algorithm is useful for overcoming the sample size difference problem. Several such algorithms are discussed in {$Li^{24}$} and particularly in Table 1 of that publication. Illustrative of those summing-type algorithms are those referred to as autoscaling, Level scaling, Mean scaling, median scaling, MS total useable signal (MSTUS), Pareto scaling, power scaling, Range scaling, Total sum, Vast scaling. MSTUS is utilized illustratively herein.

An R script (version 3.4.2) was used to model the calculations and develop the algorithms for suppression correction and MSTUS normalization. Briefly, all the peaks used in the algorithms had minimum criteria: 1) they had to be present in all samples, 2) they had to be above a minimum peak area (or height), and 3) and the ratio between the C13-IS and the C12 monoisotopic peaks had to be greater than 0.001. As to criterion 1), the peaks used can be present in both portions so that the number calculated varies sample by sample, or in present all samples so that the same set is used, so that preferably, the peaks are present in both and/or all samples.

The original dataset had 389 IROA peaks found in all 16 samples, 232 of these peaks met the acceptance criteria and were used for MSTUS normalization. Note that the MSTUS normalization has always used a subset of the entire dataset for normalization. A subset and even a subset of the found IROA peaks is used in the algorithm, but because they are all IROA peaks all assured to be of biological origin, and with 232 compounds being considered there are plenty to determine the MSTUS ratios needed.

For all the peaks the suppression-corrected C12 values were used as they are a better reflection of the true concentration found in the sample. These suppression-corrected values were determined by multiplying the least suppressed C13-IS value by the ratio of the C12 and IROA AUCs. (These ranged from 0.001 to 98.5.) The C13-IS values were fixed at the least suppressed value seen for that particular IS compound.

For normalization, the MSTUS sum for the C12 side was divided by the MSTUS sum for the C13 side to obtain a correction factor in that when every compound was multiplied by this factor, the sum for every compound in the original sample (MSTUS C12) would be equal to the sum of all the suppression-corrected IS values. Because these samples are chemically identical, the proof of the normalization is that the values once normalized are the same. For a "normal" sample in which the chemical balance varies, the normalization makes the two sides equal but does not disturb the concentration relationships between the compounds.

Results and Discussion

Figure 2:
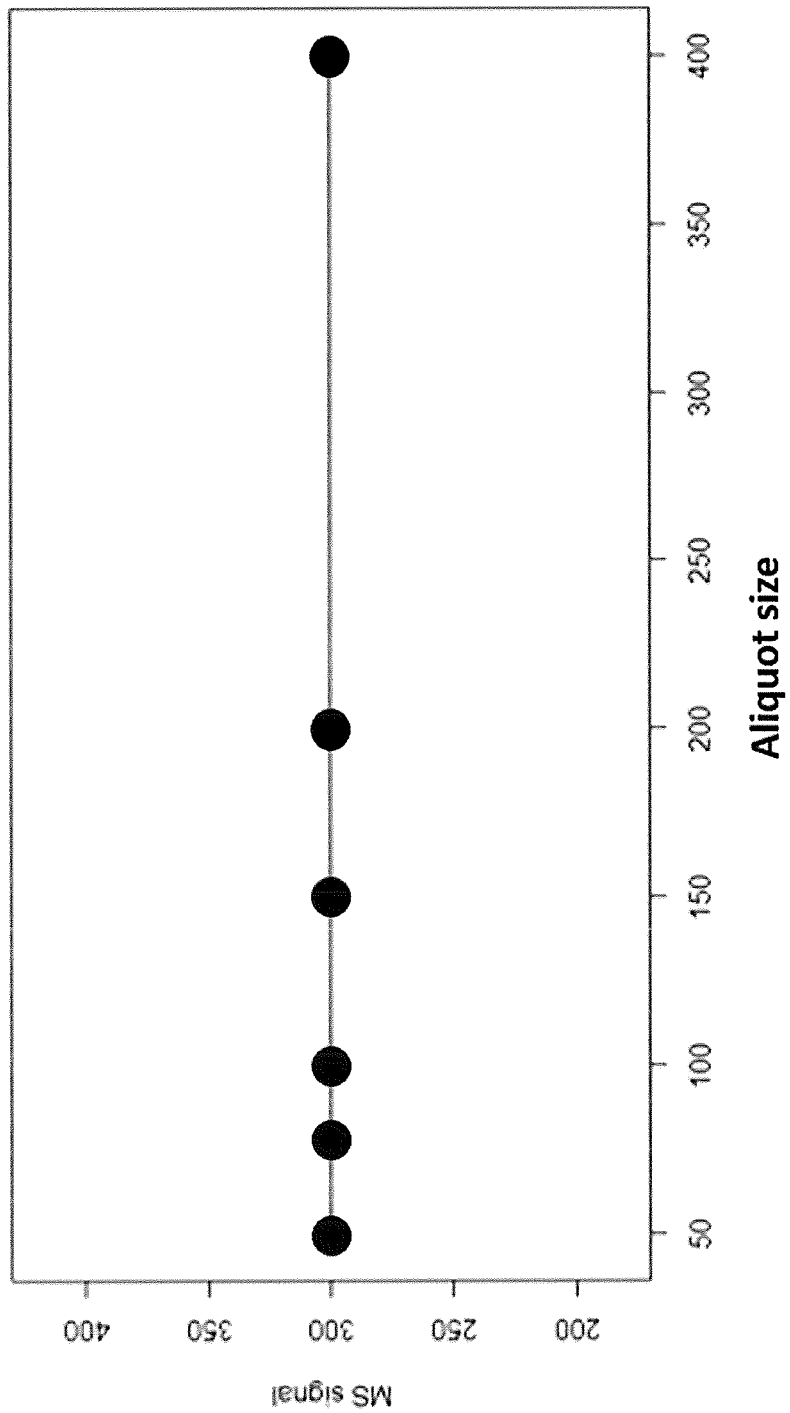
FIG. 2 is a graph showing a theoretical 13C signal for any compound in an Internal Standard plotting the MS raw data signal obtained as a function of injected aliquot size.
Figure 9:
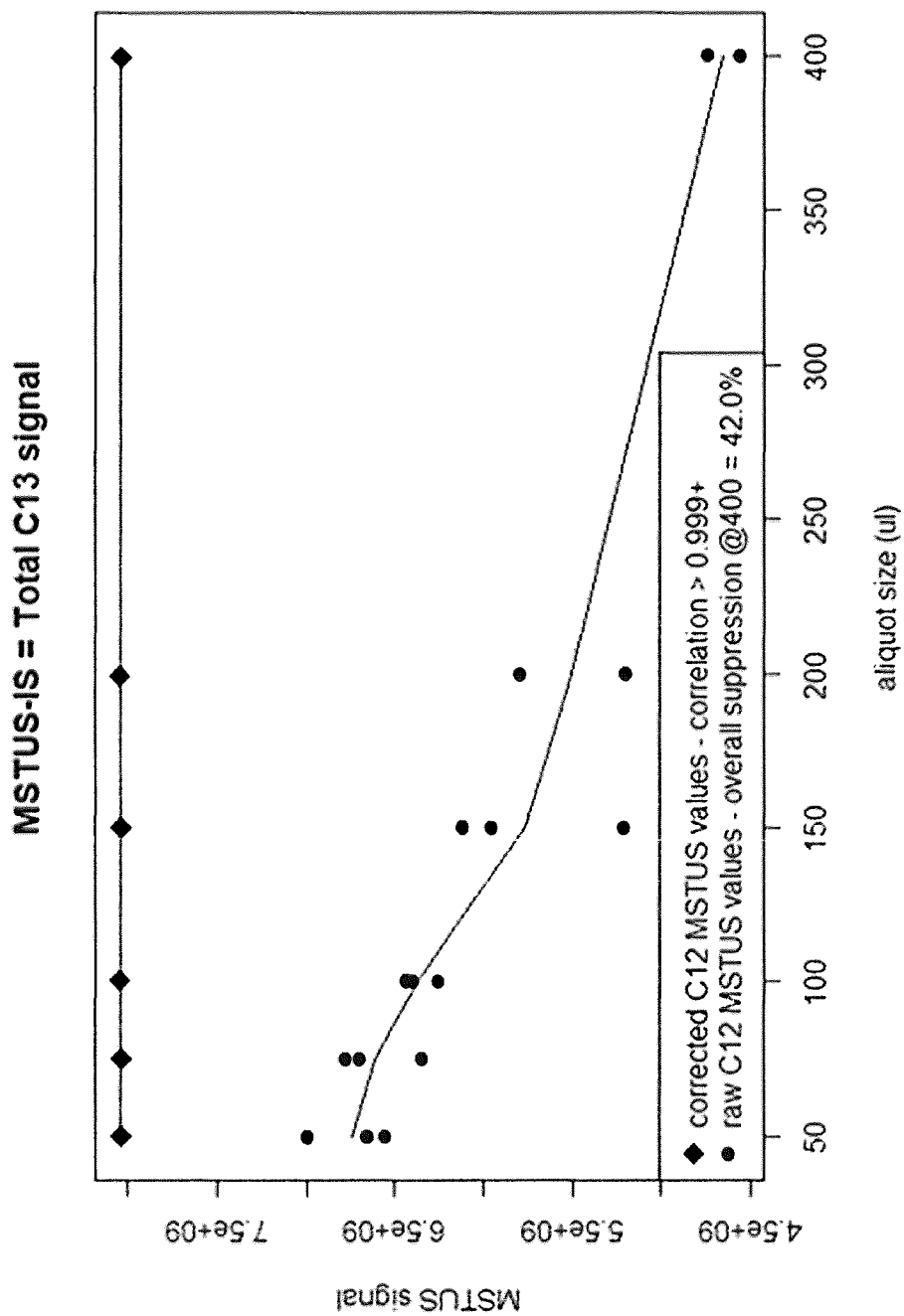
FIG. 9 is a graph showing that the total area under the curve for all compounds (MSTUS) is severely affected by suppression (circles), whereas the correlation for corrected MSTUS-IS values (diamonds) had zero standard deviation and was thus perfect to calculate.

Because the IROA Internal Standard (IROA-IS) is always present at the same concentration, the plot of the total area (or height) of all IS peaks (MSTUS-IS) should match the theoretical plot shown in FIG. 2. However, the MSTUS-IS raw values show significant cumulative effect from the overall suppression of its constituent peaks as concentration increases as is seen in FIG. 9 as compared to the corrected values.

Figure 3:
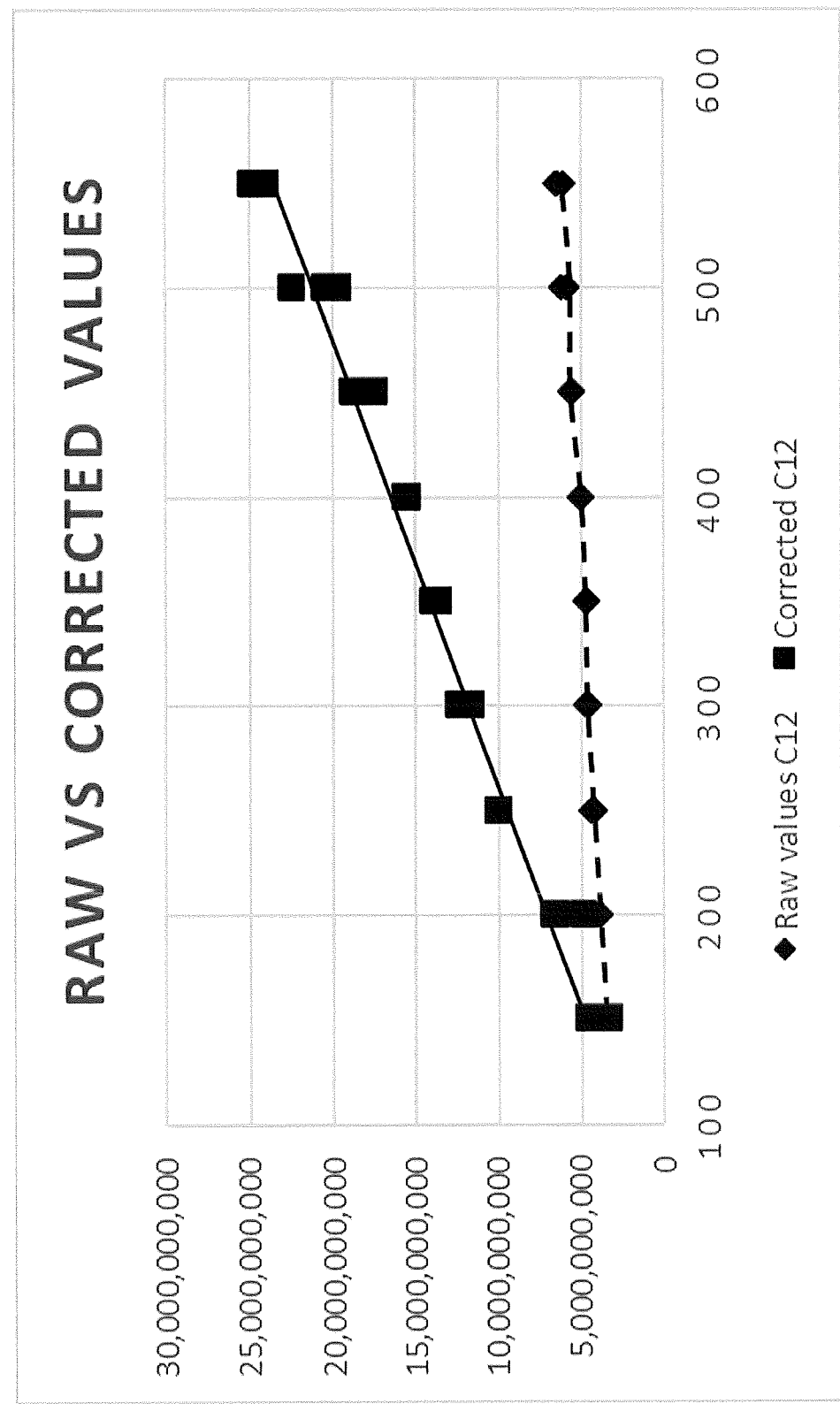
FIG. 3 through FIG. 8 were prepared using data obtained from the "Example" discussed hereinafter that utilized human plasma samples as being illustrative.

Similarly, according to the experimental design, the raw natural abundance MSTUS-C12 signal should increase predictably, as demonstrated in FIG. 1. However, in this case, as shown in FIG. 3, the actual raw data deviate because of the overall suppression affecting most of the compounds in the sample, resulting in a value that is almost 60% lower than it should be.

The above discusses the MSTUS values or the sums across all compounds in the MSTUS set. When individual compounds are examined, for instance L-tyrosine, suppression is evident in all samples except the lowest concentration. In the highest concentration samples, a suppression of 29.1% appears to be evident using the equation:

$$(SC\text{-}C12 - rawC12)/SC\text{-}C12$$

where SC-C12 is the average value of the Suppression-Corrected C12, and rawC12 is the average value of the uncorrected peaks in the same samples. It is clear from this dataset that virtually every compound exhibits some suppression, and so do their internal standards.

Therefore, it is no surprise that the IROA tyrosine Internal Standard is not only suppressed but shows exactly the same level of suppression as its natural abundance counterpart (a number independently determined). Despite the suppression of both the analyte and the Internal Standard, the ratio of the IROA IS area (or height) to the analyte area (or height) is exactly consistent with experimental design. This is not surprising because they are subject to the same environment during ionization process, and the carbon isotopes the IROA employs should not have any significant effect on ionization properties.

It has recently been shown that the IROA isotopomer collections behave identically in Ion Mobility, and predictably similar in fragmentation. Except for mass, the IROA isotopomeric peaks for any given peak will behave uniformly.

Figure 5:
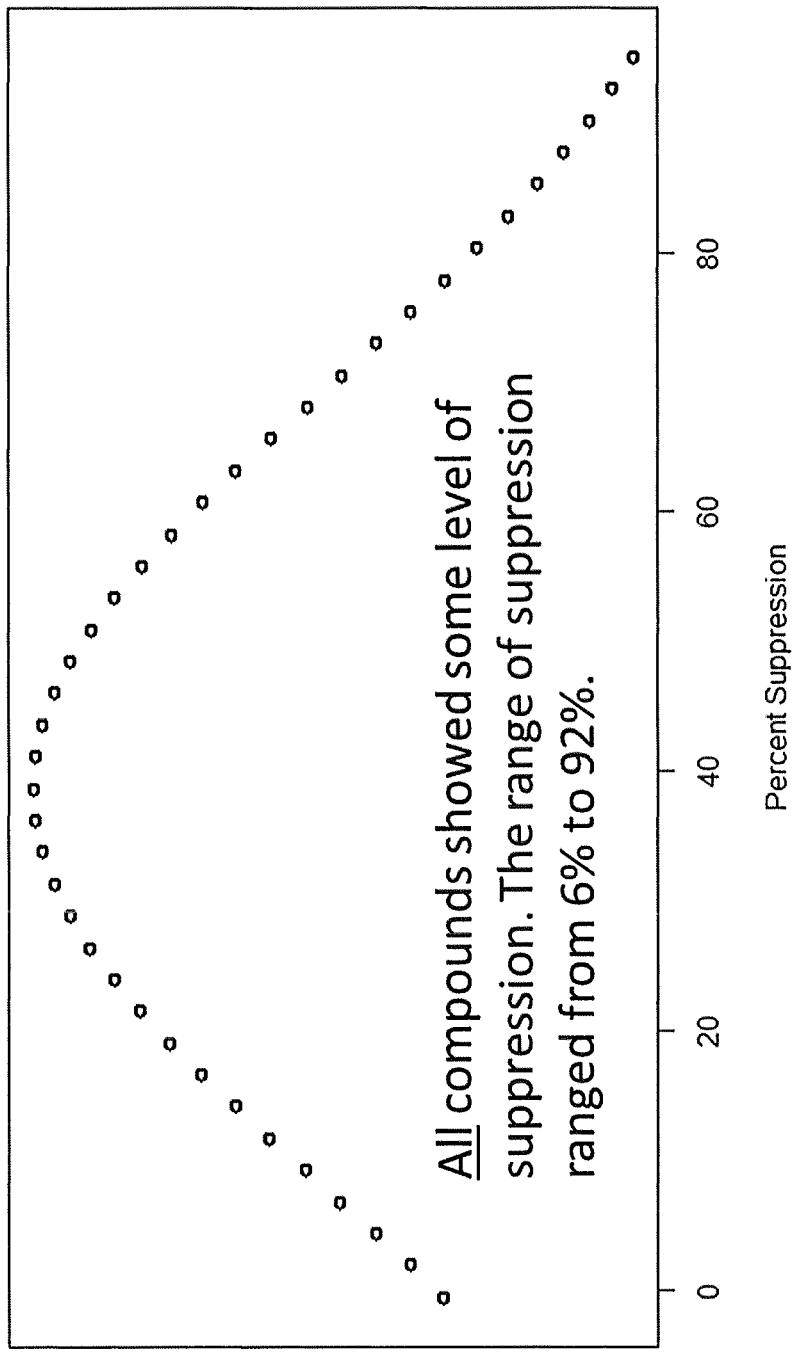
Figure 6:
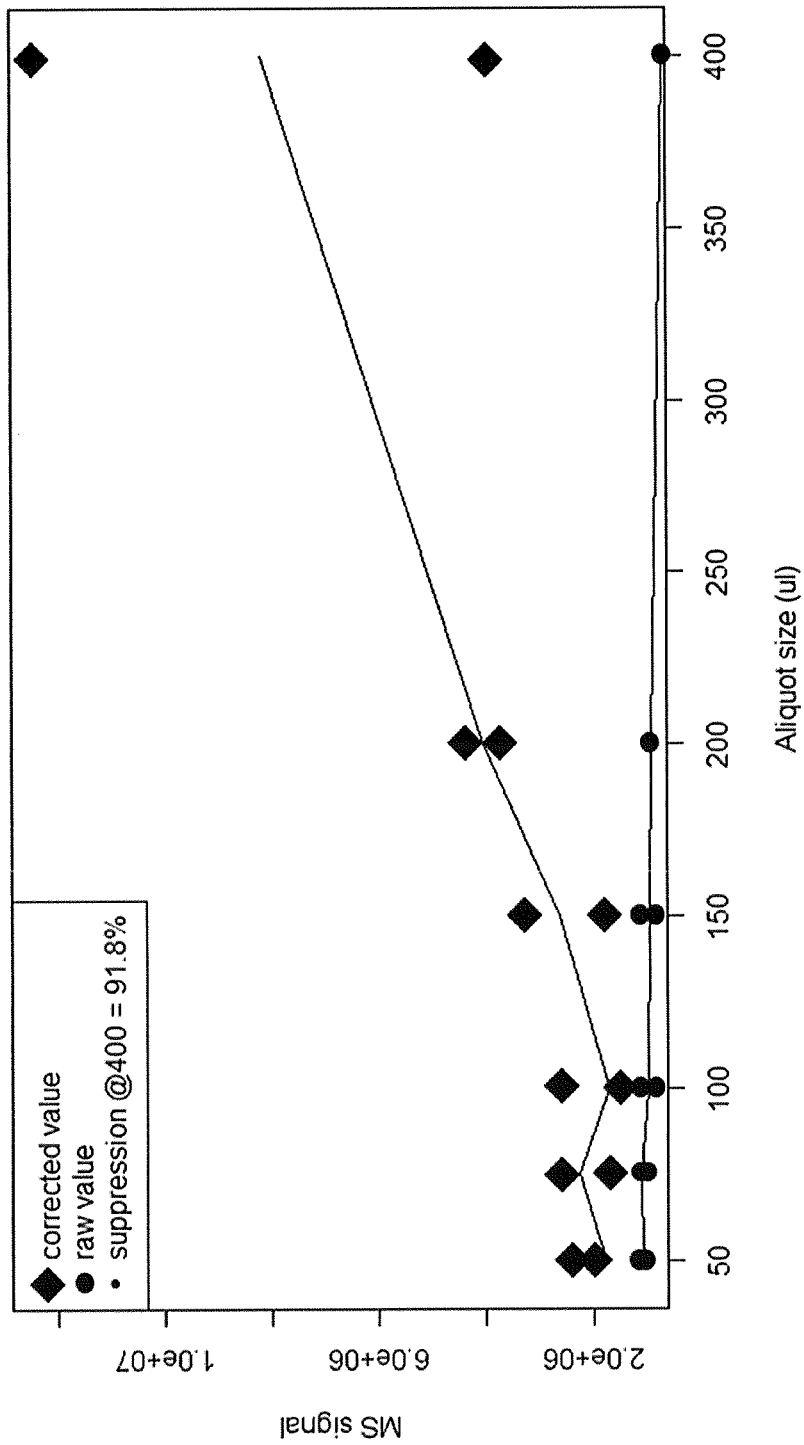

As discussed hereinafter, the 232 compounds examined and used in calculations had to have a base peak larger than 250,000, and a ratio at the lowest concentration of at least 0.001. The range of suppression for all of the compounds in this collection is about 6% to about 92% (FIG. 5). The majority of compounds appear to be suppressed at about 20 to about 60 percent. At very high levels of suppression, some compounds were so severely suppressed they were negatively correlated to their actual concentration as can be seen for the $C_9H_{16}N_2O_5$ compound of FIG. 6. It is noted that the base peak value of 250,000 is machine-specific, and varies from machine to machine.

Because the analyte to IROA-IS ratio for every compound correctly reflects the original concentration of the analyte relative to the IROA-IS, a suppression corrected value can be determined by setting the IS equal to its least suppressed value (accepted to be the highest value seen experimentally) and multiplying this value by the ratio to determine what a reasonable suppression corrected value may be.

Although any number can be used to act as the constant in place of the "least suppressed value", the use of the actual least suppressed value has the benefit of retaining the approximately correct amplitude for the peaks in question. Therefore, it is relatively easy to compute suppression corrected values for all compounds found. The formula for C12 suppression correction is:

$$X * C12/IROA\text{-}IS \text{ ratio}$$

where X can be any value, but the least suppressed observed value is of the normal amplitude. Similarly, in the absence of suppression the IROA-IS is a constant and therefore it is always assigned the same value.

The MSTUS algorithm is typically used to normalize NMR and LC/MS-based metabolomics data, especially highly variable samples such as urine. However, it is clear that MSTUS is not a perfect solution as it does not account for noise in the dataset. This noise is the result of the inclusion of artifactual data, causing extreme suppression which in turn strains the underlying rational for MSTUS itself.

In IROA noise is automatically removed as it does not exhibit an IROA profile. Thus, using a suppression-corrected value for all IROA compounds, a MSTUS algorithm can now be applied to this corrected dataset to achieve a better result. Furthermore, because an IROA internal standard has been added, there are two physical samples present (the natural abundance sample, which constitutes the analytes, and the reference IROA-IS sample), and a true normalization relative to the internal standard can be performed, with the removal of noise that was not previously possible.

The unique carbon envelope of associated peaks for each analyte in the IROA-IS (e.g., 95% C13) ensures removal of artefactual data. Specific (ClusterFinder™) algorithms are used to search for these envelopes and then identify their associated peaks in the natural abundance peak samples. Any features without a match is eliminated, removing noise and artifactual data. The calculation for the MSTUS normalization correction factors is:

$$sumSCC12/sumSCIS$$

where sumSCC12 is the total suppression-corrected area (or height) of all considered C12 compound peaks, and sumSCIS is the total suppression-corrected area (or height) of all considered IS compounds.

The suppression-corrected values are multiplied by these factors to normalize them all to the same base. The normalized MSTUS value is the sum of all normalized values. In a normal metabolomic study, where sample sizes and chemical constituents are varying, the normalization corrects for differences in sample sizes or preparation; i.e., changes that effect the entire preparation, and the normalized sums differ because of the differences in chemical composition.

In the design of this experiment, and only in this experiment, since the samples were chemically the same the normalization should normalize all samples to be identical, and do so (not shown). The combination of the IROA and MSTUS approach provides a reproducible means to generate ion-suppression-corrected data that can be effectively normalized to achieve accurate measurements. Due to there being two data sets, a combined MSTUS summing approach can be used to better accommodate the two data sets.

Example

Sample Preparation

For each of three replicates (n=3), 75 µL of a common human plasma sample (containing K2-EDTA as anti-coagulant) were added to a polypropylene microcentrifuge tube followed by 1.5 mL of dry ice-cooled methanol, and the pooled solution was centrifuged at 16,100 g at 4° C. for 10 minutes. The supernatant was transferred to a new tube from which aliquots of 400, 200, 150, 100, 75, and 50 µL were prepared.

The methanolic aliquots were then dried using a centrifugal vacuum concentrator and stored at −80° C. Immediately before LC-MS analysis, the dried residues were resuspended in 40 µL of TQ-IS (TruQuant™ C13 IS; IROA Technologies) solution which contained 20 µg of C13 IS.

The C13 IS solution was prepared by dissolving the contents of an TQ-IS vial containing 0.6 mg of a biologically complex mixture fully labeled at 95% C13 in 1.2 mL of $H_2O$, vortexed, and briefly centrifuged. The contents of the tube were then transferred to a polypropylene autosampler vial.

TQ-LTRS (TruQuant™ Long-Term Reference Standard, IROA Technologies) was prepared by dissolving the contents of an TQ-LTRS vial containing 20 ug each of a biologically complex mixture fully labeled at both 5% and 95% C13 in 40 µL of $H_2O$. Three µL of TQ-LTRS and 5 µL of each prepared plasma sample were analyzed by making triplicate injections using both positive and negative ionization and hydrophilic interaction chromatography (HILIC) and reverse phase liquid chromatography (RPLC).

Pooled plasma was extracted using −80° C. methanol (methanol:plasma, 20:1). Six replicate aliquots of pooled extract at 150, 200, 250, 300, 350, 400, 450, 500, and 550 µL were delivered to vials, dried using a centrifugal vacuum concentrator, and stored at −80° C.

For analysis, samples were reconstituted with 40 µL of the TQ-IS (or IROA-IS) in distilled water. The TQ-LTRS was resolvated by addition of 40 µL distilled water. Samples were randomized and analyzed according to their respective chromatographic systems LC-MS.

The chromatographic system consisted of a Phenomenex Kinetex™ HILIC column (1.7 µm, 100 Å, 100×2.1 mm) as well as a Phenomenex Kinetex™ C18 column (2.6 µm, 100 Å, 150×2.1 mm) C18 column, and the column compartment was kept at 40° C. Solvent A consisted of water containing 10 mM positive ammonium acetate and 0.1% formic acid and solvent B was methanol containing 10 mM ammonium acetate and 0.1% formic acid.

A flow rate of 200 µL/minute was used throughout the duration of the chromatographic run. From 0 to 5 minutes the solvent composition was held constant at 5% solvent B. The solvent composition then ramped from 5 to 95% solvent B from 5 to 30 minutes. A solvent composition of 95% solvent B was next maintained from 30 to 40 minutes. Finally, the solvent composition was returned to 5% solvent B and held constant from 40 to 45 minutes.

Mass spectrometry was performed on a Thermo Scientific™ Orbitrap Fusion™ Lumos™ Tribrid™ operated in FTMS full-scan mode with a scan range of 70-650 m/z and a resolution of 240,000. For heated electrospray positive ionization, a spray voltage of 3500 was used and the vaporizer and capillary temperatures were set at 250 and 375° C., respectively. The sheath, auxiliary and sweep gas pressures were 35, 10, and 0 (arbitrary units), respectively.

Data Analysis

Data were analyzed using ClusterFinder™ software (version 3.1—IROA Technologies).

The TQ-IS (or IROA-IS) is a biochemically complex Internal Standard. TQ-IS and TQ-LTRS are part of the TruQuant™ workflow from IROA Technologies. The use of these reagents here is illustrative, the method described here works with other isotopic labeling systems that contain a sufficient number of compounds to ensure the MSTUS normalization is accurate. The TQ-IS is used with a matching TQ-LTRS to find, list and qualify all the compounds in the TQ-IS. The use of TQ-LTRS is not required. In this study we found and analyzed the suppressive response for 102 compounds that were present in both the internal standard and the samples.

The experimental design employed in this experiment is extremely simple; namely, varying aliquot sizes, in triplicate, of a single homogeneous solution, here an extract of human plasma, are delivered and dried under a gentle nitrogen stream. Because the source and chemistry of every sample emanates from a single homogeneous solution and vary only by volume, even though its absolute concentration may not be known, the relative quantity of every compound in every sample should increase in proportion to the volume of the original aliquot and when plotted should correspond to the FIG. 1.

Once dried, every sample is resolvated with a constant volume of an internal standard, in this case 40 µL, and therefore the quantity of every compound in the internal standard should be constant and correspond to the graph shown in FIG. 2. The samples were injected in random order and the resulting data were examined.

FIG. 3 (diamonds) shows the average response seen for all analytical compounds, but as can be seen, it does not correspond to its expected curve (FIG. 1). In this case the observed values are lower than the expected values and show a stronger deviation as the concentration increases, making it clear that the dominant, if not sole, effect seen here is suppression.

Figure 4:
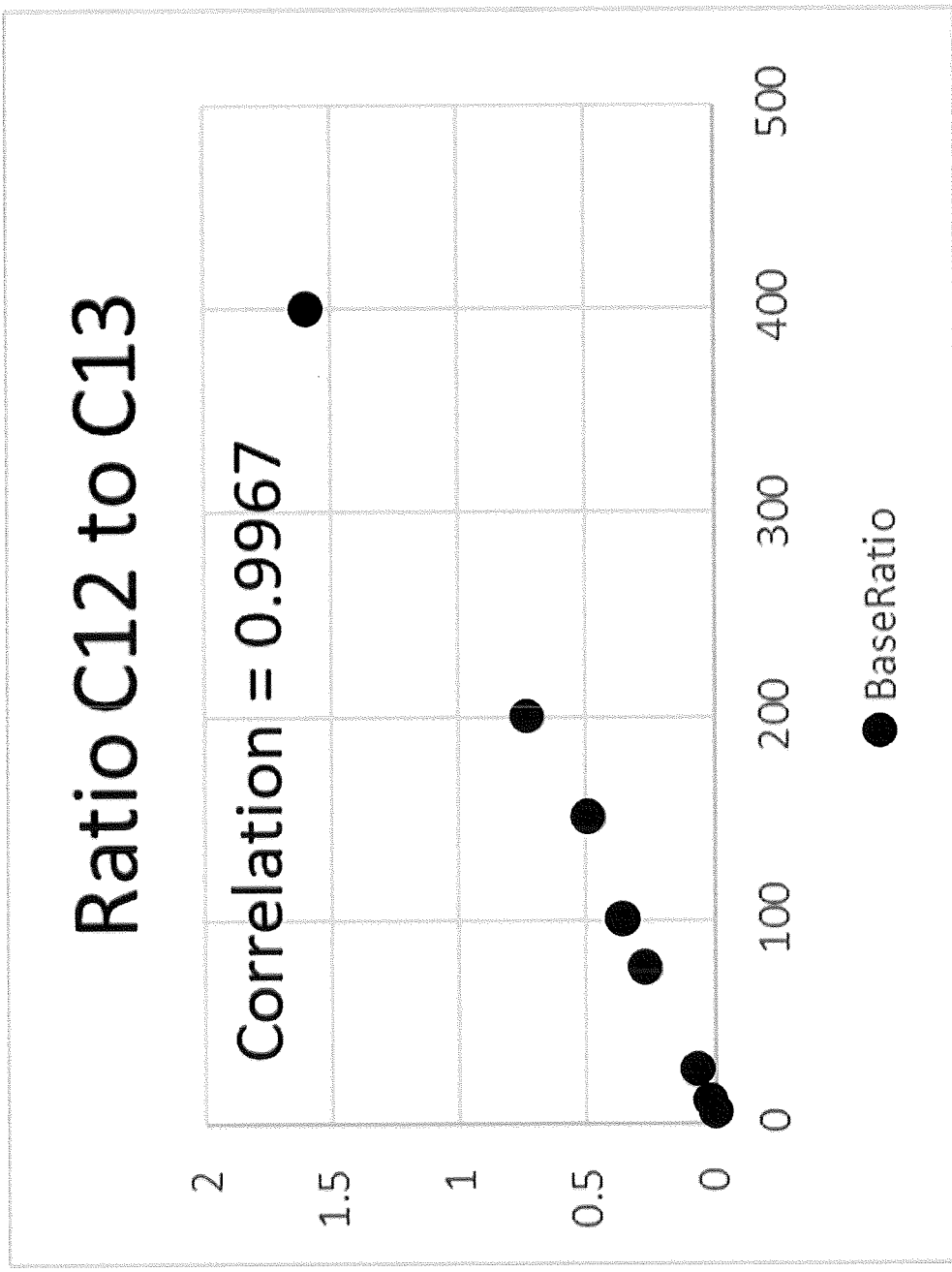

On the other hand, the theoretical ratio of the AUC for each analyte to its corresponding internal compound for all compounds; i.e., the "C12/C13 ratio", is shown in FIG. 4, and this does correspond to the expected curve (FIG. 1). Therefore, it is clear, as previous research has shown, that the overall analyte to internal standard ratio is unaffected by ion suppression, as long as the isotopes in the internal standard are C13; i.e., the ionization rates of internal standard and its corresponding analyte are generally suppressed to the same extent.

Furthermore, the least suppression will occur in the samples with the smallest aliquots of sample. Therefore, the average value for internal standard for the triplicate samples with the smallest aliquot was considered the least suppressed value for our first approximations.

Given the above-discussed observations we considered the following known and true facts: 1) it is known that the concentration for every internal standard compound in every sample is present at a constant value, 2) it has been shown that the analyte-to-internal standard ratio for all compounds appear to correctly reflect the original concentration regardless of suppression because 3) the analyte and its corresponding internal standard are equally suppressed, therefore:

1) One can correct the observed internal standard value by supplying the original "unsuppressed" value for the internal standard as the corrected value for the internal standard, and 2) multiplying this same value by the analyte-to-standard ratio to determine the correct value that the analyte would have had had it not been suppressed.

These values were quite easy to calculate for every compound internal standard and analyte pair, and raw and corrected values are seen in FIG. 3 (diamonds=raw data, squares=corrected data). The corrected data corresponds well with the theoretical graphs (FIG. 1).

In the calculations for this study we have used the values for the internal standard as seen in the samples with the lowest analyte concentration as an estimate of the "unsuppressed value". It is undoubtedly true that even this value is subject to some suppression. However, if one considers the math, it is easily recognized that the value itself is of less importance than that the value be a constant value of appropriate amplitude as such a value can be used to overcome both short and long term in-source losses.

The value we have used in this analysis has the correct approximate amplitude relative to all other compounds and we think this is of some minor benefit. Indeed, it may very well be that the establishment of a single value that is always used as a "standard value" for each compound in the Internal Standard provides a general mechanism for the creation of "standard corrected spectra" that remove the need to "normalize spectra against one-another when experiments run across multiple days, months, or even some changes to instrumentation; i.e., to overcome not just sample to sample error.

Instrument drift issues are different in that they are imposed as a gross source of variance on a majority of all mass spectral signals for an extended period of time but are also subject to random changes with time. It may be understood that this too may be corrected for. If you have a ratio that is always based on a standard amount of internal standard, and a fixed SOP the prior discussion makes it clear that you can calculate the correct value of the analyte using the method discussed above.

An analysis of the corrected to raw values indicates the range of suppression seen in this experiment was about 6% to about 91.8% (see FIG. 5). It is surprising that there were no compounds that did not suffer from any ion suppression. However, the overall shape of the distribution and the fact that the median is approximately 40% supports this observation. It is likely that there are compounds that are more highly suppressed than 91% however with so few ions surviving it is not surprising these compounds may be difficult to see. Compounds that are suppressed greater than 80% are generally negatively correlated to their injected concentration and compounds from 60% to 80% are essentially flat irrespective of the injected concentration (see FIG. 6). These facts strongly indicate why the correction of the raw data is so important.

The above corrections only correct for ion losses, they do not correct for variances in sample sizes or concentration, technically referred to as "normalization". Given the above results and discussion, it should be clear that the raw data is a sufficiently inaccurate reflection of the actual concentrations of most compounds that any normalization based on raw data contains a significant amount of error. The normalization strategy we employ here has two novel facets, firstly it uses data corrected for ion-losses, as noted above, and secondly, since there is a complete standard sample embodied in every analytical sample the experimental sample is normalized to it conjoined internal standard.

The first strategy facet reduces the overall variance of the entire dataset by correcting for all ion losses. The second facet normalizes the corrected dataset to a corrected "Standard" sample, and in doing so makes the experimental sample indirectly comparable to any other experimental sample normalized to the same "Standard" sample. The mechanism is straight forward: in correcting for ion losses we corrected both the experimental portion and the Internal Standard portion for every compound; therefore the MSTUS summing preferably also sums over the sample to provide the "sum of all corrected values in the experimental sample" be calculated, and the "sum of all corrected values in the Internal Standard sample" be calculated.

Figure 7:
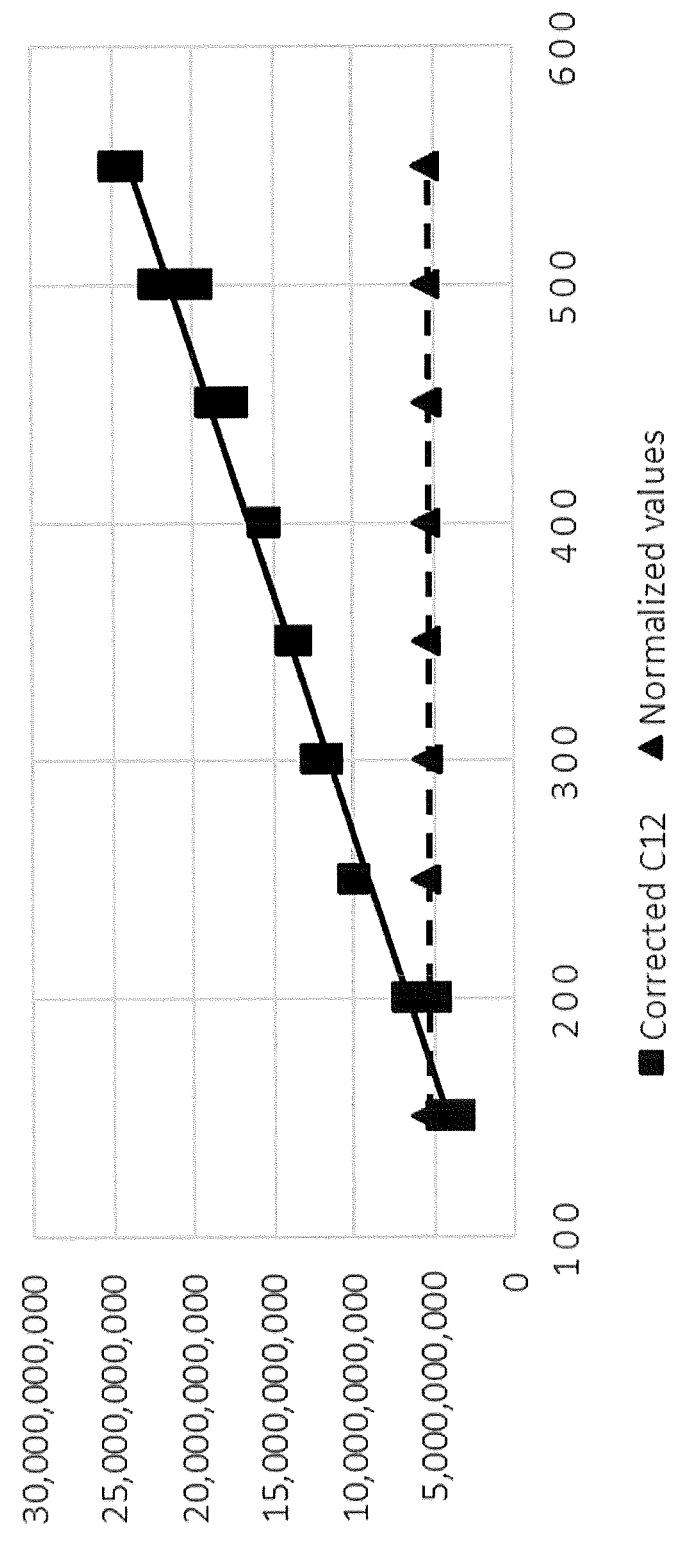

Then the "normalization factor" is the "sum of all corrected values in the experimental sample" divided by the "sum of all corrected values in the Internal Standard sample". Once calculated, all corrected values are normalized by multiplying the corrected value for each compound by the "normalization factor". Once normalized, the samples appear to of the same size despite any physical sample-to-sample differences (see FIG. 7).

Although the need for normalization is more obvious for samples such as urine, where concentrations are quite variable, it is surprisingly hard to handle very small biopsies, or other physical samples as significant variances are introduced during preparation, as moisture content, and physical losses routinely occur. This dual MSTUS algorithm adjusts all samples for all such valiances. The experimental data shown in FIG. 7 may represent an extreme case for normalization, but its success here makes it clear it will work in all situations.

Figure 8:
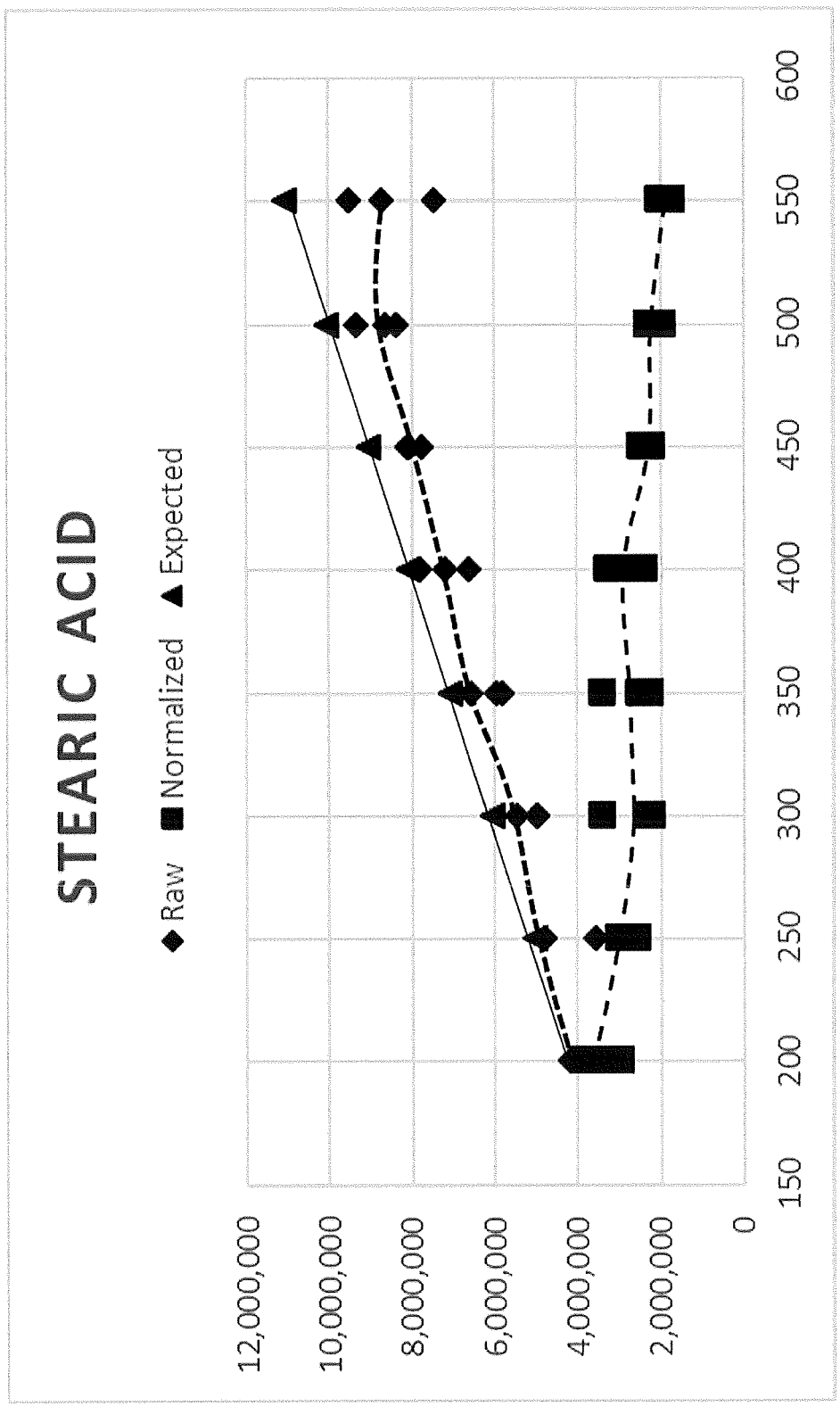

The normalization factor calculated from the loss corrected compounds is actually applicable to all of the compounds found in the experimental sample whether they have a matching internal standard or not. For this reason, the normalization factor can be applied to uncorrected peaks where there may be no opportunity to correct them and these compounds will be correctly normalized but will still show the suppression losses (see FIG. 8). Even though it is not possible to correct for ion losses, the normalized values are more accurate than the raw values.

What should be clear from this discussion is that by use of a chemically complex internal standard it is possible to correct for many of the major sources of variance in any mass spectral data set, and that once corrected that samples may be normalized to one another using the Internal Standard as the basis of a dual MSTUS algorithm. These combined actions effectively correct for a majority of the errors in most mass spectral analyses.

Each of the patents, patent applications and articles cited herein is incorporated by reference. The use of the article "a" or "an" is intended to include one or more.

The foregoing description and the examples are intended as illustrative and are not to be taken as limiting. Still other variations within the spirit and scope of this invention are possible and will readily present themselves to those skilled in the art.

CITATIONS

1. Cajka, T. & Fiehn, O. Toward Merging Untargeted and Targeted Methods in Mass Spectrometry-Based Metabolomics and Lipidomics. *Anal. Chem.* 88, 524-545 (2016).
2. Roberts, L. D., Souza, A. L., Gerszten, R. E. & Clish, C. B. Targeted Metabolomics. *Curr. Protoc. Mol. Biol.* 98, 30.2.1-30.2.24 (2012).
3. Vinayavekhin, N. & Saghatelian, A. Untargeted Metabolomics. in *Current Protocols in Molecular Biology* (John Wiley & Sons, Inc., 2010). doi:10.1002/0471142727.mb3001s90
4. Annesley, T. M. Ion suppression in mass spectrometry. *Clin. Chem.* 49, 1041-1044 (2003).
5. Trufelli, H., Palma, P., Famiglini, G. & Cappiello, A. An overview of matrix effects in liquid chromatography-mass spectrometry. *Mass Spectrom. Rev.* 30, 491-509 (2011).
6. Jessome, L. L. & A, D. Ion Suppression: A Major Concern in. *America (NY)*. 24, 498-510 (2006).
7. Ikonomou, M. G., Blades, A. T. & Kebarle, P. Investigations of the electrospray interface for liquid chromatography/mass spectrometry. *Anal. Chem.* 62, 957-967 (1990).
8. Kebarle, P. & Tang, L. From ions in solution to ions in the gas phase—the mechanism of electrospray mass spectrometry. *Anal. Chem.* 65, 972A-986A (1993).
9. Tang, L. & Kebarle, P. Dependence of ion intensity in electrospray mass spectrometry on the concentration of the analytes in the electrosprayed solution. *Anal. Chem.* 65, 3654-3668 (1993).
10. Knochenmuss, R., Dubois, F., Dale, M. J. & Zenobi, R. The Matrix Suppression Effect and Ionization Mechanisms in Matrix-assisted Laser Desorption/Ionization. *Rapid Commun. Mass Spectrom.* 10, 871-877 (1996).
11. Taylor, A. J., Dexter, A. & Bunch, J. Exploring Ion Suppression in Mass Spectrometry Imaging of a Heterogeneous Tissue. *Anal. Chem.* 90, 5637-5645 (2018).
12. Ismaiel, O., Halquist, M., ElMamly, M., Shalaby, A. & Thomaskarnes, H. Monitoring phospholipids for assessment of ion enhancement and ion suppression in ESI and APCI LC/MS/MS for chlorpheniramine in human plasma and the importance of multiple source matrix effect evaluations. *J. Chromatogr.* B 875, 333-343 (2008).
13. Vats, P. & Verma, S. M. Mechanistic Evaluation of Matrix Effect on Three Different Model of Mass Spectrometer by Using a Model Drug. *J. Anal. Bioanal. Tech.* 7, (2016).
14. Temesi, D. & Law, B. The Effect of LC Eluent Composition on MS Responses Using Electrospray Ionization. *LCGC* 1999, (1999).
15. Freitas, L. G., Götz, C. W., Ruff, M., Singer, H. P. & Müller, S. R. Quantification of the new triketone herbicides, sulcotrione and mesotrione, and other important herbicides and metabolites, at the ng/l level in surface waters using liquid chromatography-tandem mass spectrometry. *J. Chromatogr. A* 1028, 277-286 (2004).
16. Baillie, T. A. The use of stable isotopes in pharmacological research. *Pharacological Rev.* 33, 81-132 (1981).
17. de Leenheer, A. P. & Thienpont, L. M. Applications of isotope dilution-mass spectrometry in clinical chemistry, pharmacokinetics, and toxicology. *Mass Spectrom. Rev.* 11, 249-307 (1992).
18. Mashego, M. R. et al. MIRACLE: mass isotopomer ratio analysis of U-13C-labeled extracts. A new method for accurate quantification of changes in concentrations of intracellular metabolites. *Biotechnol. Bioeng.* 85, 620-8 (2004).
19. Wu, L. et al. Quantitative analysis of the microbial metabolome by isotope dilution mass spectrometry using uniformly 13C-labeled cell extracts as internal standards. *Anal. Biochem.* 336, 164-71 (2005).
20. de Jong, F. A. & Beecher, C. Addressing the current bottlenecks of metabolomics: Isotopic Ratio Outlier Analysis™, an isotopic-labeling technique for accurate biochemical profiling. *Bioanalysis* 4, 2303-2314 (2012).
21. Stupp, G. S. et al. Isotopic Ratio Outlier Analysis Global Metabolomics of *Caenorhabditis elegans*. *Anal. Chem.* 85, 11858-11865 (2013).
22. Qiu, Y. et al. Isotopic Ratio Outlier Analysis of the *S. cerevisiae* Metabolome Using Accurate Mass Gas Chromatography/Time-of-Flight Mass Spectrometry: A New Method for Discovery. *Anal. Chem.* 88, 2747-2754 (2016).
23. Clendinen, C. S. et al. An overview of methods using 13C for improved compound identification in metabolomics and natural products. *Front. Plant Sci.* 6, 1-13 (2015).
24. Li, B. et al. NOREVA: Normalization and evaluation of MS-based metabolomics data. *Nucleic Acids Res.* 45, W162-W170 (2017).

The invention claimed is:

1. A method of correcting for in-source or transmission losses of ions during mass spectral (MS) analytical analysis and using the corrected ion data to normalize for sample-to-sample differences that comprises the steps of:
   a. mass spectrally-analyzing an analytical sample to provide raw data of peak sets of parent and one or more daughter peaks indicative of each of the compounds present, said analytical sample being comprised of two portions of biologically-produced and/or semisynthetically-produced compounds having molecular weights of about 100,000 Da to about 60 Da in which a first portion is the natural isotopic abundance of a first isotope experimental sample and a second portion is a chemically complex Internal Standard sample containing about 50 to about 10,000 isotopically signed second isotope-containing compounds that may be present in the experimental sample, wherein those compounds present in both the natural abundance sample and the Internal Standard sample are referred to as paired peak sets;
   b. each of the paired peak sets is separately corrected for ion losses and used for determination of a Normalization Factor, wherein i) in-source losses are corrected for each compound by correcting its Internal Standard to a value that is an experimentally determined constant value and is always the same to provide a loss-corrected Internal Standard value, wherein said experimental constant value is determined by using the value of samples containing the lowest concentration of analyte, ii) the first isotope/second isotope ratio for each compound in each analytical sample is determined as the total area or peak set heights of all natural abundance first isotope peaks for the compounds as seen in the raw data divided by the total area or peak set heights, respectively, of all Internal Standard second isotope peak sets for the compounds as seen in the raw data, iii) the loss-corrected natural abundance value for the natural abundance compounds is determined by multiplying the loss-corrected Internal Standard value by the first isotope/second isotope ratio for each said compound, c. determining a Normalization Factor for all corrected paired peak compounds using a normalization algorithm with all corrected values so obtained for all paired peak sets for both the natural abundance and Internal Standard portions of the analytical samples, wherein i) the sum of the Internal Standard portion is the sum of the loss-corrected Internal Standard values for all compounds present in both analyte portions, ii) the sum of the natural abundance portion is the sum of the loss-corrected natural abundance values for all compounds present in both analyte portions, iii) a Normalization Factor for each analyte sample is calculated by dividing the sum of the natural abundance portion [ii) above] by the sum of the Internal Standard portion [i) above]; and d. normalizing across the sample of each natural abundance compound by multiplying each individual loss-corrected natural abundance value by the inverse of the Normalization Factor to provide a normalized natural abundance value.

2. The method according to claim 1, wherein a loss-corrected Internal Standard value for each compound is an experimentally determined value obtained from data of another analysis.

3. The method according to claim 2, wherein the values for each compound in the Internal Standard are retrieved from a database of assigned values.

4. The method according to claim 1, wherein a loss-corrected Internal Standard value for each compound is an experimentally determined from the data in the current analysis.

5. The method according to claim 1, wherein said first isotope is carbon-12 (C12) and said second isotope is carbon-13 (C13).

6. The method according to claim 1, wherein the isotopic signatures are provided by first and second isotopes of the same atom other than hydrogen and deuterium selected from the group consisting of carbon (C12 and C13), nitrogen (N14 and N15), oxygen (O16, O17, or O18), sulfur (S32, S33, S34, or S36), chlorine (C135 and C137), magnesium (Mg24, Mg25 and Mg26), silicon (Si27, Si28 and Si29), calcium (Ca40, Ca42, Ca43, and Ca44), and bromine (Br79 and Br81).

7. The method according to claim 1, wherein the isotopic signatures of the paired compounds conform to an IROA pattern.

8. The method according to claim 7, wherein the isotopic signatures are provided by a most naturally abundant isotope and one or more of the corresponding stable isotopes selected from the group consisting of C13, N15, O17, O18, S33, S34, S36, C137, Mg25, Mg26, Si28, Si29, Ca42, Ca43, Ca44 and Br81.

9. The method according to claim 1, wherein said isotopic signatures are provided semisynthetically by separately reacting the compounds of the first portion and second portion of said analytical sample with one or the other an isotopomeric reagent pair containing the same reactive group that reacts with and bonds to a functional group of one or more paired compounds present in said analytical sample portions.

10. The method according to claim 9, wherein said separate reaction of the compounds of the first portion and second portion of said analytical sample with one or the other an isotopomeric reagent pair is carried out prior to admixture of said first portion and said second portion to form said analytical sample.

11. The method according to claim 1, wherein ion losses arise from ion transmission inefficiencies.

12. The method according to claim 1, wherein the losses arise from ion suppression or ionization inefficiencies.

13. The method according to claim 1, wherein said natural isotopic abundance experimental sample containing said first isotope is obtained from human or non-human blood.

14. The method according to claim 1, wherein said Internal Standard is biologically produced.

15. The method according to claim 1, wherein said experimental sample is obtained from human or non-human serum, plasma, urine, feces, or other bodily secretions.

16. The method according to claim 1, wherein said experimental sample is obtained from a non-biological source.

17. The method according to claim 1, wherein said experimental sample is obtained from human or non-human tissues.

18. The method according to claim 1, wherein said experimental sample is obtained from plants, bacteria, or fungi.

19. The method according to claim 1, wherein said normalization algorithm utilizes MS total useable signal (MSTUS) technology.

* * * * *